United States Patent [19]
Ikehara

[11] Patent Number: 5,676,776
[45] Date of Patent: Oct. 14, 1997

[54] PNEUMATIC TIRE HAVING CROSS BELT LAYER REINFORCED WITH SPECIFIED STEEL CORD

[75] Inventor: Kiyoshi Ikehara, Tokyo, Japan

[73] Assignee: Bridgestone Corporation, Tokyo, Japan

[21] Appl. No.: 454,690

[22] Filed: May 31, 1995

Related U.S. Application Data

[62] Division of Ser. No. 348,200, Nov. 28, 1994, Pat. No. 5,584,169, which is a continuation of Ser. No. 2,035, Jan. 8, 1993, abandoned.

[30] Foreign Application Priority Data

| Jan. 9, 1992 | [JP] | Japan | 4-19374 |
| Jan. 9, 1992 | [JP] | Japan | 4-19375 |
| Jan. 9, 1992 | [JP] | Japan | 4-19376 |
| Dec. 25, 1992 | [JP] | Japan | 4-347279 |
| Dec. 25, 1992 | [JP] | Japan | 4-347280 |
| Dec. 25, 1992 | [JP] | Japan | 4-347281 |

[51] Int. Cl.$^6$ .................. B60C 9/18; B60C 9/20
[52] U.S. Cl. .......... 152/527; 57/902; 152/451; 152/526
[58] Field of Search .............. 57/210, 212, 213, 57/217, 223, 311, 902; 152/451, 527, 526

[56] References Cited

U.S. PATENT DOCUMENTS

| 3,513,898 | 5/1970 | Lugli et al. | 152/526 X |
| 4,509,318 | 4/1985 | Yoneda | 57/212 |
| 4,566,261 | 1/1986 | Brandyberry et al. | 57/212 |
| 4,690,191 | 9/1987 | Kawasaki | 57/902 X |
| 4,732,197 | 3/1988 | Heishi et al. | 152/451 |
| 4,887,421 | 12/1989 | Haislet | 57/58.54 |
| 4,938,015 | 7/1990 | Kinoshita | 57/902 X |
| 5,024,261 | 6/1991 | Igarashi et al. | 57/902 X |
| 5,285,836 | 2/1994 | Kawamura | 152/451 |
| 5,319,915 | 6/1994 | Kobayashi et al. | 152/451 X |
| 5,351,470 | 10/1994 | Shinmura | 152/451 X |

FOREIGN PATENT DOCUMENTS

| 0 462 716 | 12/1991 | European Pat. Off. | 57/902 |
| 2 476 548 | 8/1981 | France . | |
| 2 676 466 | 11/1992 | France | 57/902 |
| 56-14396 | 4/1981 | Japan . | |
| 56-131404 | 10/1981 | Japan . | |
| 59-1790 | 1/1984 | Japan . | |
| 60-38208 | 2/1985 | Japan . | |
| 60-49421 | 11/1985 | Japan . | |
| 60-178204 | 11/1985 | Japan . | |
| 62-21641 | 5/1987 | Japan . | |
| 1-175503 | 7/1989 | Japan . | |
| 2-154086 | 6/1990 | Japan . | |

OTHER PUBLICATIONS

Research Disclosure, No. 175, Nov. 1978, Emsworth GB, pp. 26–28.
Research Disclosure, No. 327, Jul. 1991, Emsworth GB, pp. 552–558.

*Primary Examiner*—Adrienne C. Johnstone
*Attorney, Agent, or Firm*—Sughrue, Mion, Zinn, Macpeak & Seas, PLLC

[57] ABSTRACT

A steel cord for reinforcing rubber articles comprises one wave-form or helical core steel filament and five to eight sheath steel filaments disposed around the core steel filament, the pitch Pc of the core steel filament is 3.0 dc/0.34≤Pc≤10.0 dc/0.34 (dc=diameter of steel core filament) and the core forming ratio Rc=Lc/dc (Lc is an amplitude of the wave or helix of the core steel filament) is within a particular range varying depending on the number of sheath steel filaments. A pneumatic tire contains a cross-belt reinforced with the above-mentioned steel cords where i) an angle θ formed by the reinforcing steel cords and the equatorial plane of the tire is:
  12°≤θ≤30°
(ii) a gap between any two adjacent steel cords in the same layer of the cross belt, I, is:
  0.5 mm≤I≤2.0 mm
(iii) a gauge of the gum between any two facing steel cords in different layers of the cross belt, G, is:
  0.35 mm ≤G≤2.0 mm.

4 Claims, 5 Drawing Sheets

PNEUMATIC TIRE HAVING CROSS BELT LAYER REINFORCED WITH SPECIFIED STEEL CORD

This is a division of application Ser. No. 08/348,200, filed Nov. 28, 1994, now U.S. Pat. No. 5,584,169, which is a continuation of application Ser. No. 08/002,035, filed Jan. 8, 1993, now abandoned.

BACKGROUND OF THE INVENTION

1. Field of the Invention

The present invention relates to a steel cord for reinforcing rubber articles, and more particularly, to a steel cord for reinforcing rubber articles that is capable of improving the resistance to corrosion propagation.

2. Description of the Related Art

Products reinforced with steel cords may suffer from corrosion of steel filaments caused by water entering the products, such that the durability and life of the products are lowered.

For example, when steel cords in a belt of a tire have a void, and the tire tread is subjected to damage reaching the belt, water entering the belt spreads along the longitudinal direction of the cord through the voids in the steel cords. As a result, rust formed due to water also diffuses, and the adhesion between the rubber and the steel cords is lessened. Finally, separation phenomena occur.

In order to prevent such corrosion propagation, a cord structure has been proposed in which rubber can sufficiently penetrate into the inside of the cord through gaps between adjacent metal filaments during a curing process.

Japanese Patent Publication Nos. 62-21641 and 60-49421 disclose that gaps between filaments of a cord can be formed by excess shaping. However, retaining such gaps is difficult, and moreover, the advantageous effect varies undesirably depending on the manner of handling in the step of manufacturing tires.

On the contrary, there are techniques for assuring gaps between filaments by improving the cord structure without shaping filaments.

Japanese Patent Application Laid-open Nos. 60-38208 and 59-1790 disclose that one of the above-mentioned cord structures, a so-called "(1+5) structure" cord composed of one core filament and five sheath filaments, has gaps between sheath filaments through which rubber can easily penetrate, and further that this cord can be produced by one-step twisting. As a result, productivity is high.

Indeed the average sheath gaps are sufficient in such a cord structure, but deviation occurs in the arrangement of sheath filaments, and the filaments have attaching portions where rubber does not penetrate due to fluctuation in the manufacturing procedure.

Japanese Patent Application Laid-open No. 1-175503 proposes a steel cord composed of one core filament and six sheath filaments, and Japanese Utility Model Application No. 60-178204 and Japanese Patent Application Laid-open No. 2-154086 disclose two-layer twisted steel cords composed of a core of two metal filaments and a sheath filament disposed around the core.

In particular, the (1+6) structure cord of the above-mentioned Japanese Patent Application Laid-open No. 1-75503 can be produced by one step twisting which is advantageous from the standpoint of productivity. The disclosed (1+6) cord has a structure such that the diameter of the core filament is larger than that of the sheath filament so as to ensure a gap larger than a predetermined size between adjacent sheath filaments for enabling rubber to penetrate. However, a deviation can occur in the arrangement of sheath cores, such that rubber does not penetrate where sheath filaments contact each other. Consequently, sufficient resistance to corrosion propagation can not be attained in the case of tires for trucks running on a severely rough road with a lot of water. Further, the weight of cord is large and productivity is lowered.

Japanese Patent Application Laid-open No. 56-131404 discloses that a cord of (1+5) structure may be formed such that the core filament is slightly wavy, but in this cord structure the diameter of the core filament is thinner than that of the sheath filament, and therefore the distance between sheath filaments is so narrow that rubber can not easily enter the gaps. Further, the rigidity of the core filament is so low that the wave shape of the core has little effect. In addition, when the core shaping ratio (waving) is large, the strength is lowered.

A diameter of the core filament could be made larger than that of the sheath filament to assure a gap larger than a predetermined size between adjacent filaments so that rubber penetrates. However, this method increases the total weight of the cord, and the productivity is deteriorated and deviation of the arrangement of sheath filaments occurs to cause attachment between the sheath filaments. As a result, rubber can not penetrate the cord, resulting in less resistance to corrosion propagation.

SUMMARY OF THE INVENTION

An object of the present invention is to provide a steel cord capable of improving the life of rubber articles.

Another object of the present invention is to provide a steel cord capable of improving the resistance to corrosion propagation of rubber articles.

A further object of the present invention is to provide a steel cord capable of improving a resistance to corrosion propagation and imparting a high strength to rubber articles.

Still another object of the present invention is to provide a pneumatic tire reinforced with one of the above-mentioned steel cords.

According to one aspect of the present invention, there is provided a steel cord for reinforcing rubber articles which comprises

- a single wavy core steel filament having a sinusoidal shape, and five to eight sheath steel filaments disposed around the wavy core steel filament,
- the pitch Pc of the wavy core steel filament being in the following range, $$3.0 \, dc/0.34 \leq Pc \leq 10.0 \, dc/0.34$$

where dc is the diameter of the core steel filament, and the core forming ratio Rc (=Lc/dc) where dc is as defined above and Lc is an amplitude of the wave of the core steel filament being selected from the group consisting of $$0.12 \leq Rc \leq 1.0$$

in the case of five sheath steel filaments, $$0.12 \leq Rc \leq 1.5$$

in the case of six sheath steel filaments, $$0.48 \leq Rc \leq 1.86$$

in the case of seven sheath steel filaments, and $$0.98 \leq Rc \leq 2.36$$

in the case of eight sheath steel filaments.

According to another aspect of the present invention, there is provided a steel cord for reinforcing rubber articles which comprises one helical core steel filament, and five to eight sheath steel filaments disposed around the helical core steel filament, the pitch Pc of the helical core steel filament being in the following range, 3.0 dc/0.34≦Pc≦10.0 dc/0.34 where dc is the diameter of the core steel filament, the core forming ratio Rc(=Lc/dc) where dc is as defined above and Lc is an amplitude of the helix of the core steel filament being selected from the group consisting of 0.12≦Rc≦1.0 in the case of five sheath steel filaments, 0.12≦Rc≦1.5 in the case of six sheath steel filaments, 0.42≦Rc≦1.8 in the case of seven sheath steel filaments, and 1.74≦Rc≦2.12 in the case of eight sheath steel filaments, and the helical direction being opposite to the direction of twisting the sheath steel filaments.

According to a further aspect of the present invention, there is provided a pneumatic tire reinforced with one kind of the above-mentioned steel cords which comprises a cross belt layer where (i) an angle θ formed by the reinforcing steel cords and the equatorial plane of the tire is:
12°≦θ≦30°

(ii) a gap between any two adjacent steel cords in one layer of the cross belt, I, is:
0.5 mm≦I≦2.0 mm (iii) a gauge of the gum between any two facing cords in different layers of the cross belt, G, is:
0.35 mm≦G≦2.0 mm.

DESCRIPTION OF THE PREFERRED EMBODIMENTS

According to one aspect of the present invention, the steel cord has wavy core steel filament. The shape of the wave is within a particular range of amplitudes and a particular range of pitches depending on the number of sheath steel filaments disposed around the wavy core steel filament. Thus, a gap between sheath steel filaments into which rubber penetrates is assured. The wavy core has the following advantages.

The wavy shape can be formed with high productivity at low cost. Sheath filaments do not substantially contact one another. Further, the cord itself can be a flat cord since it has a flat core. Therefore, the increase in cord thickness due to forming the core can be prevented, and the increase of the rubber layer gauge can be prevented. Moreover, the rubber permeability can be improved resulting in an increase in the resistance to corrosion propagation.

As for the shape of wave, a wave similar to a triangle which has a sharp apex is not preferable. A wave having a mild curve such as a sine wave is preferable since concentration of stress at the apex is avoided.

As used herein the terms "wavy" and "wave-form" are interchangeable.

The core shaping ratio Rc=Lc/dc of the wavy core steel filament is in the following range:

0.12≦Rc≦1.0 for (1+5) structure
0.12≦Rc≦1.5 for (1+6) structure
0.48≦Rc≦1.86 for (1+7) structure
0.98≦Rc≦2.36 for (1+8) structure In the parentheses above, "1" stands for a single wavy core steel filament, and "5", "6", "7" and "8" stand for the number of sheath steel filaments.

When Rc is lower than the above-mentioned range, the sheath steel filaments are not sufficiently dispersed. Consequently, the sheath gap may be too small, and rubber will not penetrate into the inside of the cord. On the other hand, when Rc is higher than the above-mentioned range, the configuration of the filaments becomes uneven, and in the case where a tensile load is put on the cord, the stress is not uniformly applied and therefore the strength of cord is lower.

The pitch Pc of the wave-form core steel filament is in the following range:

3.0 dc/0.34≦Pc≦10.0 dc/0.34

When Pc is larger than this range, the sheath steel filaments are not sufficiently dispersed. Consequently, the sheath gap may be too small, and rubber will not penetrate into the inside of the cord. On the other hand, when Pc is smaller than this range, the strength of the core steel filament is lower due to the load put on the core steel filament as the filament is formed, and loads are not uniformly applied to the core steel filaments and the sheath steel filaments. Consequently, the cord strength becomes insufficient in the case where a tensile load is applied to the cord.

When the steel cord is used as a reinforcing material so as to assure the strength of the rubber composite and make the rubber composite lighter, it is preferable to use a steel cord composed of a high tensile strength steel containing 0.80–0.85% by weight of carbon.

As mentioned in Description of the Related Art above, when the diameter of the core filament is too thin or when it is thicker than that of the sheath filaments, there are various disadvantages.

Therefore, for the purpose of eliminating such disadvantages and further enhancing the manufacturing productivity, it is preferable that the diameter of the core steel filament dc is substantially the same as the diameter of the sheath steel filament ds.

That is, when dc is smaller than ds, the distance between sheath steel filaments becomes so small that the penetration of rubber is adversely affected and the rigidity of the core steel filament is so low that the advantages due to its wavy shape are lower.

On the contrary, when dc is larger than ds, the weight of the cord increases and the productivity becomes low. Further, deviation in the arrangement of sheath filaments occurs so as to cause attachment between sheath filaments, resulting in less penetration of rubber and insufficient resistance to corrosion preparation.

In another embodiment of the present invention, the core steel filament is helical. When a plurality of core filaments are used, voids are formed in the core portion and rubber can not penetrate. On the contrary, when one helical core steel filament is used, the disadvantages of using a plurality of core filaments can be eliminated. Further, stress concentrations can be avoided due to the helical shape of the core filament, resulting in good fatigue resistance and excellent strength.

The core shaping ratio Rc=Lc/dc of the "one helical core steel filament" is in the following range:

0.12≦Rc≦1.0 for (1+5) structure
0.12≦Rc≦1.5 for (1+6) structure
0.42≦Rc≦1.8 for (1+7) structure
0.74≦Rc≦2.12 for (1+8) structure In the parentheses above, "1" stands for a single helical core steel filament, and "5", "6", "7" and "8" stand for the numbers of sheath steel filaments.

When Rc is lower than the above-mentioned range, the sheath steel filaments are not sufficiently dispersed. Consequently, the sheath gap may be too small, and rubber will not penetrate into the inside of the cord. On the other hand, when Rc is higher than the above-mentioned range, the configuration of the filaments becomes uneven, and in the case where a tensile load is put on the cord, the stress is not uniformly applied and therefore the strength of cord is lowered.

The pitch Pc of the helical core steel filament is in the following range:

3.0 dc/0.34≦Pc≦10.0 dc/0.34

When Pc is larger than this range, the sheath steel filaments are not sufficiently dispersed. Consequently, the sheath gap may be too small, and rubber will not penetrate into the inside of the cord. On the other hand, when Pc is smaller than this range, the strength of the core steel filament is lower due to the load put on the core steel filament as the filament is formed, and loads are not uniformly applied to the core steel filaments and the sheath steel filaments. Consequently, the cord strength becomes insufficient in the case where a tensile load is applied to the cord.

The core forming ratio Rc and the pitch of helical core steel filament Pc are determined by measuring a steel core removed from a rubber article without causing a plastic deformation.

The helical direction of the core steel filament is opposite to the direction of twisting the sheath steel filaments according to the present invention. When both directions are the same, the length of the helical core steel filament contacting the same sheath filament becomes long, and therefore the helical core steel filament contacts two sheath filaments and portions into which rubber can not penetrate (cf. FIG. 10, the right upper part where a helical core steel filament 5 contacts two sheath steel filaments) are connected in the longitudinal direction resulting in a low resistance to corrosion propagation.

When the steel cord is used as a reinforcing material so as to assure the strength of the rubber composite and make the rubber composite lighter, it is preferable to use a steel cord composed of a high tensile strength steel containing 0.80–0.85% by weight of carbon.

In this embodiment of the present invention, it is also preferable that the diameter of the helical core steel filament dc is substantially the same as the diameter of the sheath steel filament ds. The reason is the same as that in the previous embodiment relating to the wavy core steel filament and sheath steel filaments.

The steel cord for reinforcing rubber articles of the present invention is useful as a reinforcing material for various rubber articles, for example, rubber composites such as pneumatic tires, belts for industry and the like.

The steel cord according to the present invention can suppress the propagation of corrosion due to water and the like, that is, the resistance to corrosion propagation is improved, and therefore, the separation phenomenon can be prevented while the strength of cord can be retained.

Rubber can sufficiently penetrate into the steel cord of the present invention, that is, a sufficient amount of rubber after curing can stably penetrate into the steel cord having the particular structure according to the present invention.

According to the present invention, by using a helical core steel filament, the sheath filaments do not substantially contact one another, particularly if the helical direction of the helical core steel filament is opposite to the direction of twisting the sheath steel filaments.

The steel cord of the present invention can be manufactured with good productivity and is not adversely affected by fluctuations in the manufacturing steps.

According to the present invention, durability of rubber articles, for example, rubber composites, can be improved and the life can be extended while the mechanical strength of the rubber articles is retained.

Figure 1:
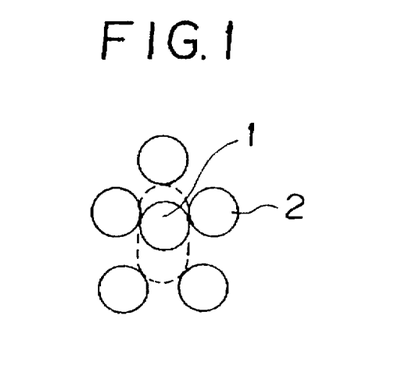
FIG. 1 is a schematical cross sectional view of a (1+5) steel cord with a wavy core filament according to the present invention.

FIG. 1 shows schematically a cross sectional view of a (1+5) steel cord composed of one wavy core filament 1 and five sheath filaments 2 twisted around the wavy core filament 1 according to the present invention.

The wavy core filament 1 extends in the space shown by the closed dotted line.

Figure 2:
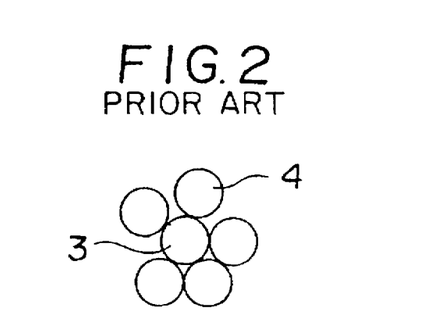
FIG. 2 is a schematical cross sectional view of a conventional (1+5) steel cord without a core filament.

FIG. 2 shows schematically a cross sectional view of a conventional (1+5) steel cord. Five sheath filaments 4 are twisted around a core filament 3 (not formed), and three of the sheath filaments contact each other.

Figure 3:
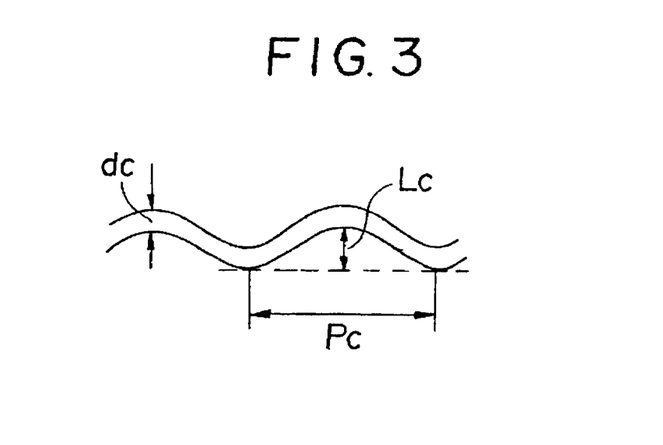
FIG. 3 is a schematical cross sectional view of a wavy core filament cut along the wave plane according to the present invention.

FIG. 3 schematically shows a cross sectional view of a core filament 1 cut parallel to the wave plane of the present invention, where dc stands for the diameter of core filament 1, Lc the amplitude of the wavy core filament and Pc the pitch of the wavy core filament.

The core forming ratio Rc is defined as follows:
Rc=Lc/dc

Figure 4:
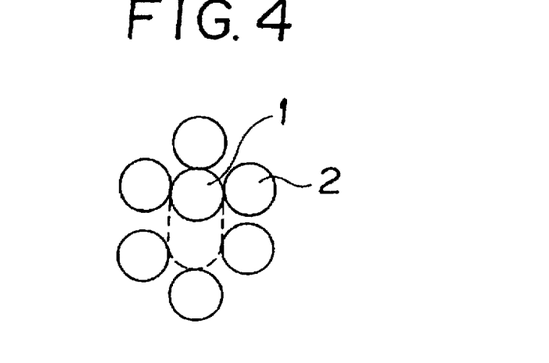
FIG. 4 is a schematical cross sectional view of a (1+6) steel cord with a wavy core filament according to the present invention.

FIG. 4 shows schematically a cross sectional view of a (1+6) steel cord composed of one wavy core filament 1 and six sheath filaments 2 twisted around the wavy core filament 1 according to the present invention.

The wavy core filament 1 extends in the space shown by the closed dotted line.

Figure 5:
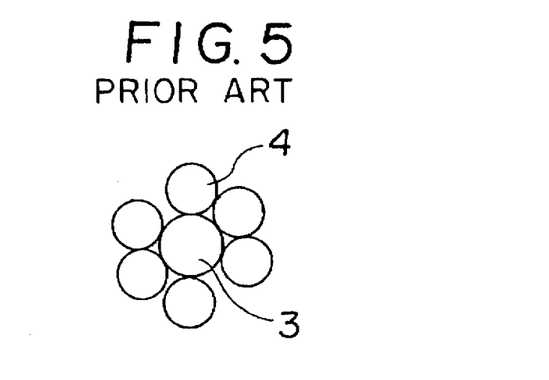
FIG. 5 is a schematical cross sectional view of a conventional steel cord in which the core filament is larger in diameter than that of the sheath filament.

FIG. 5 shows schematically a cross sectional view of a conventional (1+6) steel cord composed of one core filament 3 (not formed) and six sheath filaments 4 twisted around the core filament 3. The diameter of core filament 3 is larger than that of sheath filament 4. Two sheath filaments and three sheath filaments contact each other.

Figure 6:
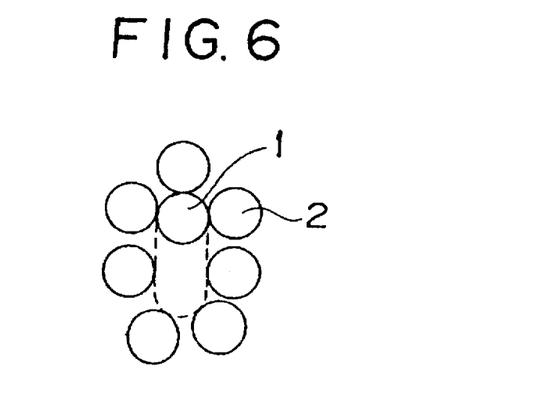
FIG. 6 is a schematical cross sectional view of a (1+7) steel cord with a wavy core filament according to the present invention.

FIG. 6 shows schematically a cross sectional view of a (1+7) steel cord composed of one wavy core filament 1 and seven sheath filaments 2 twisted around the wavy core filament 1 according to the present invention.

The wavy core filament 1 extends in the space shown by the closed dotted line.

Figure 7:
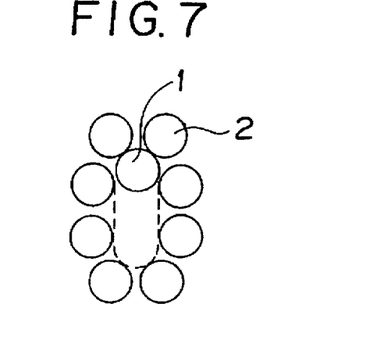
FIG. 7 is a schematical cross sectional view of a (1+8) steel cord with a wavy core filament according to the present invention.

FIG. 7 shows schematically a cross sectional view of a (1+8) steel cord composed of one wavy core filament 1 and eight sheath filaments 2 twisted around the wavy core filament 1 according to the present invention.

The wavy core filament 1 extends in the space shown by the closed dotted line.

Figure 8:
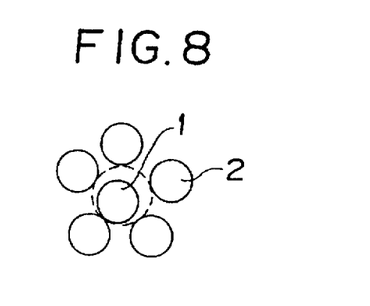
FIG. 8 is a schematical cross sectional view of a (1+5) steel cord with a helical core filament according to the present invention.

FIG. 8 shows schematically a cross sectional view of a (1+5) steel cord composed of one helical core filament 1 and five sheath filaments 2 twisted around the helical core filament 1 in which the helical direction of the helical core filament 1 is opposite to the direction of twisting the sheath filaments 2 according to the present invention.

The helical core filament 1 extends in the space shown by the closed dotted line.

Figure 9:
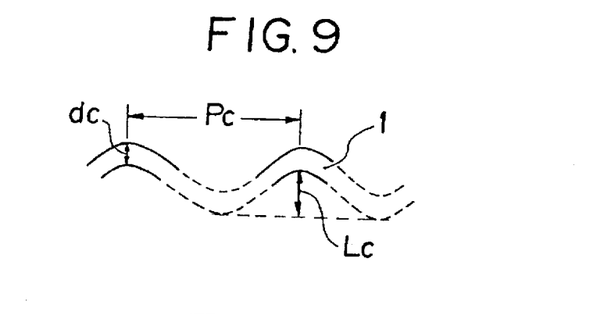
FIG. 9 is a schematical side view of a helical core filament viewed from the direction perpendicular to the axis of the filament.

FIG. 9 is a schematical side view of a helical core filament 1 viewed from the direction perpendicular to the axis of the helical core filament.

In FIG. 9, dc stands for the diameter of the helical core filament, Lc is the amplitude of the helical core filament and Pc the pitch of the helical core filament.

Figure 10:
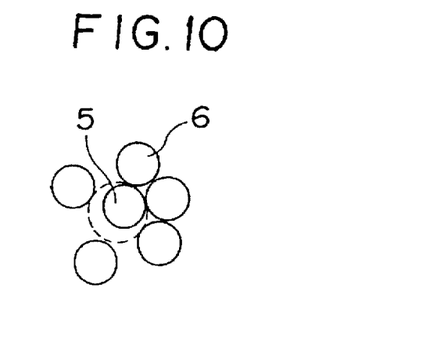
FIG. 10 is a schematical cross sectional view of a (1+5) steel cord with a helical core filament of which the helical direction is the same as the direction of twisting sheath filaments showing that the sheath filaments contact each other.

FIG. 10 shows schematically a cross sectional view of a (1+5) steel cord composed of one helical core filament 5 and five sheath filaments 6 twisted around the helical core filament 5 in which the helical direction of the helical core filament 5 is the same as the direction of twisting the sheath filaments 6. The helical core filament 5 extends in the space shown by the closed dotted line.

The three sheath filaments 6 at the right hand side of the cord contact each other.

Figure 11:
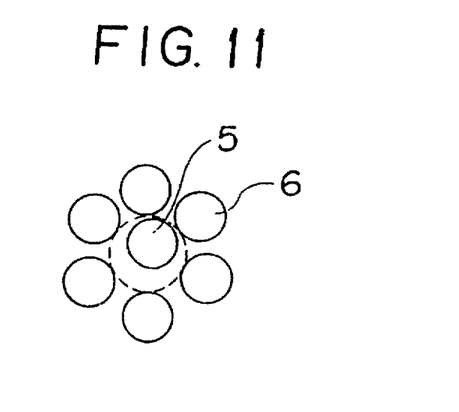
FIG. 11, FIG. 12 and FIG. 13 show schematically cross sectional views of (1+6) steel cord, (1+7) steel cord and (1+8) steel cord, each having a helical core filament, respectively, according to the present invention.

FIG. 11 shows schematically a cross sectional view of a (1+6) steel cord composed of one helical core filament 5 and six sheath filaments 6 twisted around the helical core filament 5 in which the helical direction of the helical core filament 5 is opposite to the direction of twisting the sheath filaments according to the present invention.

The helical core filament 5 extends in the space shown by the closed dotted line.

Figure 12:
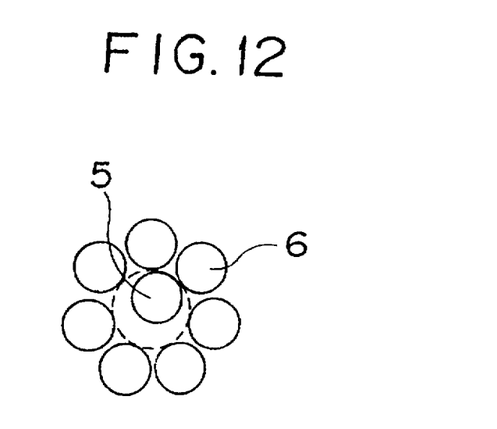

FIG. 12 shows schematically a cross sectional view of a (1+7) steel cord composed of one helical core filament 5 and seven sheath filaments 6 twisted around the helical core filament 5 in which the helical direction of the helical core filament 5 is opposite to the direction of twisting the sheath filaments 6 according to the present invention.

The helical core filament 5 extends in the space shown by the closed dotted line.

Figure 13:
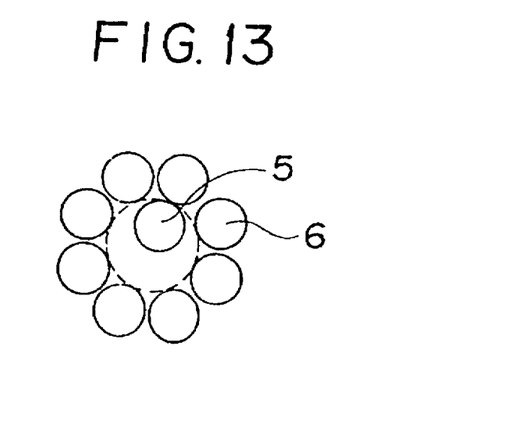

FIG. 13 shows schematically a cross sectional view of a (1+8) steel cord composed of one helical core filament 5 and eight sheath filaments 6 twisted around the helical core filament 5 in which the helical direction of the helical core filament 5 is opposite to the direction of twisting the sheath filaments 6 according t the present invention.

The helical core filament 5 extends in the space shown by the closed dotted line.

According to another embodiment of the present invention, a pneumatic tire includes a cross belt layer with one of the above-mentioned steel cords as a reinforcing steel cord, and the angle $\theta$ formed by the reinforcing steel cord and the equatorial plane of the tire, the gap between two adjacent steel cords in the same layer of the cross belt, I, and the gauge of the gum between two facing cords in different layers of the cross belt, G, are within the respective numerical ranges as mentioned above.

The angle $\theta$ is $12° \leq \theta \leq 30°$. When $\theta$ is less than 12°, the shearing strain between layers during tire running increases, and separation is liable to occur.

The gap, 1, is 0.5 mm $\leq$ I $\leq$ 2.0 mm. When I is less than 0.5 mm, adjacent cracks formed at the end of the cross belt are connected with each other and extend to the direction of the equatorial plane. As a result, separation is liable to occur.

The gauge of the gum, G, is 0.35 mm $\leq$ G $\leq$ 2.0 mm. When G is less than 0.35 mm, the shearing strain between rubber layers of the cross belt during tire running increases, and separation is liable to occur.

On the other hand, when $\theta$, I or G is larger than the upper limit, 30°, 2.0 mm or 2.0 mm, respectively, the stiffness of the cross belt layer in the direction of the equatorial plane is lower, and the diameter of the tire increases when the inner pressure is increased and when the vehicle is running, and therefore, strain occurs in the rubber around the steel cords. As a result, separation is liable to occur.

Figure 15:
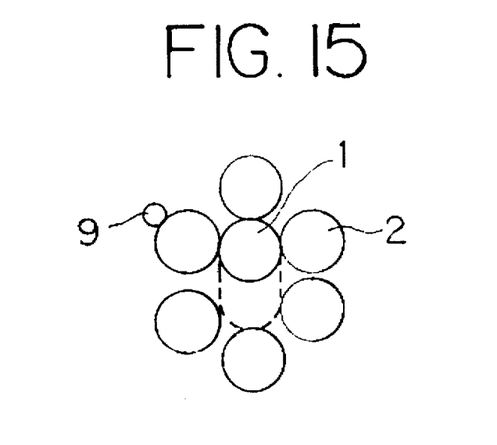
FIG. 15 is a schematical cross sectional view of the FIG. 4 (1+6) steel cord to which a spiral filament has been added.

A spiral filament 9 may be added to the reinforcing steel cord, as shown in FIG. 15. By adding a spiral filament, the shape at the cord cut end can be controlled, and therefore, the productivity is improved and development of cracks formed at the belt end can be suppressed.

Even when a spiral filament is added, the diameter of the cord is not markedly affected, but the above-mentioned advantage can be obtained.

The reinforcing steel cord is preferably made of steel containing 0.80–0.85% by weight of carbon. Further, the diameter of the core steel filament dc is preferably substantially the same as the diameter of the sheath steel filament ds. The advantages resulting from the above-mentioned carbon content and the filament diameters dc and ds are similar to those with respect to the steel cord itself as mentioned above.

Figure 14:
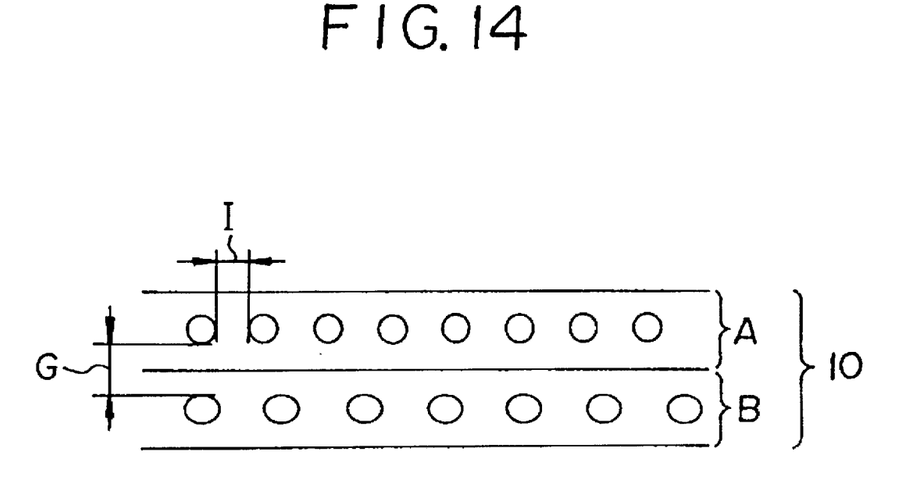
FIG. 14 shows a schematical cross sectional view perpendicular to one cross layer belt gauge at a crown center of a tire of the present invention.

FIG. 14 is a schematical cross sectional view perpendicular to cords of layer A of a cross belt layer 10 composed of layer A and layer B, at the crown center portion of a tire of the present invention.

I denotes the gap between two adjacent steel cords in the same layer, and G the gauge of the gum between two facing cords in different layers.

The pneumatic tire according to the present invention exhibits good suppression of the propagation of corrosion due to water and the like while the strength of cord is retained. The tire structure is also suitable for suppressing development of cracks at the belt end. Therefore, the durability of the tire is improved and the life of tire can be improved to a great extent.

The present invention is now more particularly described with reference to the following examples which are for the purpose of illustration only and are intended to imply no limitation thereon.

EXAMPLES 1-16, COMPARATIVE EXAMPLES 1-14

Thirty (30) radial tires for trucks and buses were prepared. The tires had a size of 10.00 R20 and included a belt in which steel cords were buried, the steel cords having core forming ratio Rc, core wave-form pitch Pc, cord structure, core filament diameter dc, sheath filament diameter ds, and sheath twisting pitch Ps as shown in Tables 1–6.

The resulting 30 radial tires were evaluated for resistance to corrosion propagation (separation resistance) and cord strength. The results are shown in Tables 1–6.

The resistance to corrosion propagation was measured as follows.

A belt cord (100 mm) covered with rubber was removed from a tire and the side surface was covered with a silicone sealant. Then, one end of the cord was soaked in a 10% aqueous solution of NaOH and the aqueous solution was allowed to enter the cord from the cut surface only. After 24 hours of the soaking, the rubber was peeled off by means of pinchers, and the length (mm) of the cord where the metal was exposed was regarded as a corrosion propagation portion.

TABLE 1

| Example | 1 | 2 | 3 | 4 | 5 | 6 |
|---|---|---|---|---|---|---|
| Core forming ratio Rc | 0.15 | 0.47 | 0.47 | 0.62 | 1.0 | 0.47 |
| Core wave-form pitch Pc (mm) | 3.3 | 3.3 | 4.4 | 5.5 | 9.0 | 3.0 |
| Cord structure | 1 + 5 | 1 + 5 | 1 + 5 | 1 + 5 | 1 + 5 | 1 + 5 |
| Core filament diameter dc (mm) | 0.34 | 0.34 | 0.34 | 0.34 | 0.34 | 0.23 |
| Sheath filament diameter ds (mm) | 0.34 | 0.34 | 0.34 | 0.34 | 0.34 | 0.23 |
| Sheath twisting pitch Ps (mm) | 17 | 17 | 17 | 17 | 17 | 11.5 |
| Resistance to corrosion propagation (mm) | 20 | 10 | 10 | 10 | 15 | 10 |
| Cord strength (kgf) | 1717 | 170 | 171 | 170 | 169 | 77 |

TABLE 2

| Comparative Example | 1 | 2 | 3 | 4 | 5 |
|---|---|---|---|---|---|
| Core forming ratio Rc | 0.10 | 0.47 | 1.2 | 0.47 | 1.2 |
| Core wave-form pitch Pc (mm) | 4.4 | 2.8 | 5.5 | 11.0 | 3.0 |
| Cord structure | 1 + 5 | 1 + 5 | 1 + 5 | 1 + 5 | 1 + 5 |
| Core filament diameter dc (mm) | 0.34 | 0.34 | 0.34 | 0.34 | 0.23 |
| Sheath filament diameter ds (mm) | 0.34 | 0.34 | 0.34 | 0.34 | 0.23 |
| Sheath twisting pitch Ps (mm) | 17 | 17 | 17 | 17 | 11.5 |
| Resistance to corrosion propagation (mm) | 85 | 10 | 10 | 100 | 10 |
| Cord strength (kgf) | 171 | 155 | 153 | 170 | 69 |

TABLE 3

| Example | 7 | 8 | 9 | 10 | 11 |
|---|---|---|---|---|---|
| Core forming ratio Rc | 0.15 | 0.47 | 0.32 | 0.47 | 0.47 |
| Core wave-form pitch Pc (mm) | 3.3 | 3.3 | 4.4 | 4.4 | 5.5 |
| Cord structure | 1 + 6 | 1 + 6 | 1 + 6 | 1 + 6 | 1 + 6 |
| Core filament diameter dc (mm) | 0.34 | 0.34 | 0.34 | 0.34 | 0.34 |
| Sheath filament diameter ds (mm) | 0.34 | 0.34 | 0.34 | 0.34 | 0.34 |
| Sheath twisting pitch Ps (mm) | 17 | 17 | 17 | 17 | 17 |
| Resistance to corrosion propagation (mm) | 30 | 10 | 15 | 10 | 17 |
| Cord strength (kgf) | 201 | 199 | 200 | 200 | 200 |

TABLE 4

| Example | 12 | 13 | 14 | 15 | 16 |
|---|---|---|---|---|---|
| Core forming ratio Rc | 0.62 | 1.5 | 0.47 | 1.2 | 1.0 |
| Core wave-form pitch Pc (mm) | 5.5 | 9.0 | 3.0 | 6.5 | 6.0 |
| Cord structure | 1 + 6 | 1 + 6 | 1 + 6 | 1 + 8 | 1 + 7 |
| Core filament diameter dc (mm) | 0.34 | 0.34 | 0.23 | 0.34 | 0.34 |
| Sheath filament diameter ds (mm) | 0.34 | 0.34 | 0.23 | 0.34 | 0.34 |
| Sheath twisting pitch Ps (mm) | 17 | 17 | 11.5 | 17 | 17 |
| Resistance to corrosion propagation (mm) | 10 | 20 | 10 | 20 | 20 |
| Cord strength (kgf) | 199 | 197 | 90 | 253 | 225 |

TABLE 5

| Comparative Example | 6 | 7 | 8 | 9 | 10 |
|---|---|---|---|---|---|
| Core forming ratio Rc | 0.10 | 0.47 | 1.6 | 0.47 | 0 |
| Core wave-form pitch Pc (mm) | 4.4 | 2.8 | 6.0 | 11.0 | — |
| Cord structure | 1 + 6 | 1 + 6 | 1 + 6 | 1 + 6 | 1 + 6 |
| Core filament diameter dc (mm) | 0.34 | 0.34 | 0.34 | 0.34 | 0.34 |
| Sheath filament diameter ds (mm) | 0.34 | 0.34 | 0.34 | 0.34 | 0.28 |
| Sheath twisting pitch Ps (mm) | 17 | 17 | 17 | 17 | 14 |
| Resistance to corrosion propagation (mm) | 100 | 10 | 10 | 100 | 60 |
| Cord strength (kgf) | 200 | 182 | 180 | 200 | 150 |

TABLE 6

| Comparative Example | 11 | 12 | 13 | 14 |
|---|---|---|---|---|
| Core forming ratio Rc | 0 | 1.6 | 0.4 | 0.90 |
| Core wave-form pitch Pc (mm) | — | 3.0 | 6.0 | 6.5 |
| Cord structure | 1 + 6 | 1 + 6 | 1 + 7 | 1 + 8 |
| Core filament diameter dc (mm) | 0.40 | 0.23 | 0.34 | 0.34 |
| Sheath filament diameter ds (mm) | 0.34 | 0.23 | 0.34 | 0.34 |
| Sheath twisting pitch Ps (mm) | 17 | 11.5 | 17 | 17 |
| Resistance to corrosion propagation (mm) | 55 | 10 | 80 | 80 |
| Cord strength (kgf) | 202 | 80 | 225 | 253 |

Comparative Example 1 shows that the resistance to corrosion propagation was as poor as 85 mm when the core forming ratio was less than 0.12.

Comparative Example 1 shows that the cord strength was lowered to 155 kgf when the core waveform pitch was less than 3.00 mm.

Comparative Example 3 shows that the cord strength was lowered to 153 kgf when the core forming ratio is larger than 1.0.

Comparative Example 4 shows that the resistance to corrosion propagation was as poor as 100 mm when the core wave-form pitch was larger than 10.0 mm.

Comparative Example 5 shows that the cord strength was lowered to 69 kgf as compared with Example 6 when the core forming ratio was larger than 1.0 though the core filament diameter and the sheath filament diameter were small.

Comparative Example 6 shows that the resistance to corrosion propagation was as poor as 100 mm when the core forming ratio was smaller than 6.12.

Comparative Example 7 shows that the cord strength was as poor as 182 kgf when the core wave-form pitch Pc smaller then 3.0 dc/0.34.

Comparative Example 8 shows that the cord strength was as poor as 180 kgf when the core forming ratio was larger than 1.5.

Comparative Example 9 shows that the resistance to corrosion propagation was as poor as 100 mm when the core wave-form pitch Pc was larger than 10.0 dc/0.34.

Comparative Examples 10 and 11 show that the resistance to corrosion propagation was poor in each case where the core filament was not formed into a wave.

Comparative Examples 12 shows that the cord strength was as poor as 80 kgf when the core forming ratio was larger than 1.5 and each of the core filament and the sheath filament was 0.23 mm in diameter.

Comparative Example 13 shows that the resistance to corrosion propagation was poor when a (1+7) structure was used and the core forming ratio was smaller than 0.48.

Comparative Example 14 shows that the resistance to corrosion propagation was poor when a (1+8) structure was used and the core forming ratio was smaller than 0.98.

EXAMPLES 17–32 COMPARATIVE EXAMPLES 15–30

Thirty-two (32) radical tires for trucks and buses were prepared. The tires had a size of 10.00 R20 and included a belt in which steel cords were buried, the steel cords having core forming ratio Rc, core helical pitch Pc, cord structure, core filament diameter dc, sheath filament diameter ds, sheath twisting pitch Ps, core shaping helical direction and sheath twisting direction as shown in Tables 7–12.

The resulting 32 radial tires were evaluated for resistance to corrosion propagation (separation resistance) and cord strength. The results are shown in Tables 7–12.

The resistance to corrosion propagation was measured as mentioned above.

The helical direction and sheath twisting direction (Z and S) are defined by JIS G 3510.

The separation resistance is measured by disintegrating a pneumatic tire fitted to a car and worn completely as a result of having run on a bad road, and observing whether or not a separation at the end of the belt occurred.

TABLE 7

| Example | 17 | 18 | 19 | 20 | 21 |
|---|---|---|---|---|---|
| Core forming ratio Rc | 0.15 | 0.47 | 0.47 | 0.62 | 1.0 |
| Core helical pitch (mm) | 3.3 | 3.3 | 4.4 | 5.5 | 9.0 |
| Cord structure | 1 + 5 | 1 + 5 | 1 + 5 | 1 + 5 | 1 + 5 |
| Core filament diameter dc (mm) | 0.34 | 0.34 | 0.34 | 0.34 | 0.34 |

TABLE 7-continued

| Example | 17 | 18 | 19 | 20 | 21 |
|---|---|---|---|---|---|
| Sheath filament diameter ds (mm) | 0.34 | 0.34 | 0.34 | 0.34 | 0.34 |
| Sheath twisting pitch Ps (mm) | 17 | 17 | 17 | 17 | 17 |
| Core forming helical direction | Z | Z | Z | Z | Z |
| Sheath twisting direction | S | S | S | S | S |
| Resistance to corrosion propagation (mm) | 20 | 10 | 10 | 10 | 15 |
| Cord strength (kgf) | 171 | 170 | 171 | 170 | 169 |

TABLE 8

| Example | 22 | 23 | 24 | 25 | 26 |
|---|---|---|---|---|---|
| Core forming ratio Rc | 0.47 | 0.15 | 0.47 | 0.32 | 0.47 |
| Core helical pitch (mm) | 3.0 | 3.3 | 3.3 | 4.4 | 4.4 |
| Cord structure | 1 + 5 | 1 + 6 | 1 + 6 | 1 + 6 | 1 + 6 |
| Core filament diameter dc (mm) | 0.23 | 0.34 | 0.34 | 0.34 | 0.34 |
| Sheath filament diameter ds (mm) | 0.23 | 0.34 | 0.34 | 0.34 | 0.34 |
| Sheath twisting pitch Ps (mm) | 11.5 | 17 | 17 | 17 | 17 |
| Core forming helical direction | Z | Z | Z | Z | Z |
| Sheath twisting direction | S | S | S | S | S |
| Resistance to corrosion propagation (mm) | 10 | 30 | 10 | 15 | 10 |
| Cord strength (kgf) | 77 | 201 | 199 | 200 | 200 |

TABLE 9

| Example | 27 | 28 | 29 | 30 | 31 | 32 |
|---|---|---|---|---|---|---|
| Core forming ratio Rc | 0.47 | 0.62 | 1.5 | 0.47 | 1.2 | 1.0 |
| Core helical pitch (mm) | 5.5 | 5.5 | 9.0 | 3.0 | 6.5 | 6.0 |
| Cord structure | 1 + 6 | 1 + 6 | 1 + 6 | 1 + 6 | 1 + 8 | 1 + 7 |
| Core filament diameter dc (mm) | 0.34 | 0.34 | 0.34 | 0.23 | 0.34 | 0.34 |
| Sheath filament diameter ds (mm) | 0.34 | 0.34 | 0.34 | 0.23 | 0.34 | 0.34 |
| Sheath twisting pitch Ps (mm) | 17 | 17 | 17 | 11.5 | 17 | 17 |
| Core forming helical direction | Z | Z | Z | Z | Z | Z |
| Sheath twisting direction | S | S | S | S | S | S |
| Resistance to corrosion propagation (mm) | 17 | 10 | 20 | 10 | 20 | 20 |
| Cord strength (kgf) | 200 | 199 | 197 | 90 | 253 | 225 |

TABLE 10

| Comparative Example | 15 | 16 | 17 | 18 | 19 |
|---|---|---|---|---|---|
| Core forming ratio Rc | 0.10 | 0.47 | 1.2 | 0.47 | 0.47 |
| Core helical pitch (mm) | 4.4 | 2.8 | 5.5 | 11.0 | 4.4 |
| Cord structure | 1 + 5 | 1 + 5 | 1 + 5 | 1 + 5 | 1 + 5 |
| Core filament diameter dc (mm) | 0.34 | 0.34 | 0.34 | 0.34 | 0.34 |
| Sheath filament diameter ds (mm) | 0.34 | 0.34 | 0.34 | 0.34 | 0.34 |
| Sheath twisting pitch | 17 | 17 | 17 | 17 | 17 |

TABLE 10-continued

| Comparative Example | 15 | 16 | 17 | 18 | 19 |
|---|---|---|---|---|---|
| Ps (mm) | | | | | |
| Core forming helical direction | Z | Z | Z | Z | S |
| Sheath twisting direction | S | S | S | S | S |
| Resistance to corrosion propagation (mm) | 85 | 10 | 10 | 100 | 55 |
| Cord strength (kgf) | 171 | 155 | 153 | 170 | 171 |

TABLE 11

| Comparative Example | 20 | 21 | 22 | 23 | 24 |
|---|---|---|---|---|---|
| Core forming ratio Rc | 1.2 | 0.10 | 0.47 | 1.6 | 0.47 |
| Core helical pitch (mm) | 3.0 | 4.4 | 2.8 | 6.0 | 11.0 |
| Cord structure | 1 + 5 | 1 + 6 | 1 + 6 | 1 + 6 | 1 + 6 |
| Core filament diameter dc (mm) | 0.23 | 0.34 | 0.34 | 0.34 | 0.34 |
| Sheath filament diameter ds (mm) | 0.23 | 0.34 | 0.34 | 0.34 | 0.34 |
| Sheath twisting pitch Ps (mm) | 11.5 | 17 | 17 | 17 | 17 |
| Core forming helical direction | Z | Z | Z | Z | Z |
| Sheath twisting direction | S | S | S | S | S |
| Resistance to corrosion propagation (mm) | 10 | 100 | 10 | 10 | 100 |
| Cord strength (kgf) | 69 | 200 | 182 | 180 | 200 |

TABLE 12

| Example | 25 | 26 | 27 | 28 | 29 | 30 |
|---|---|---|---|---|---|---|
| Core forming ratio Rc | 0 | 0 | 0.47 | 1.6 | 0.35 | 0.65 |
| Core helical pitch (mm) | — | — | 4.4 | 3.0 | 6.0 | 6.5 |
| Cord structure | 1 + 6 | 1 + 6 | 1 + 6 | 1 + 6 | 1 + 7 | 1 + 8 |
| Core filament diameter dc (mm) | 0.34 | 0.40 | 0.34 | 0.23 | 0.34 | 0.34 |
| Sheath filament diameter ds (mm) | 0.28 | 0.34 | 0.34 | 0.23 | 0.34 | 0.34 |
| Sheath twisting pitch Ps (mm) | 14 | 17 | 17 | 11.5 | 17 | 17 |
| Core forming helical direction | Z | Z | S | Z | Z | Z |
| Sheath twisting direction | S | S | S | S | S | S |
| Resistance to corrosion propagation (mm) | 60 | 55 | 55 | 10 | 90 | 90 |
| Cord strength (kgf) | 150 | 202 | 202 | 80 | 225 | 253 |

In Tables 10 and 11, Comparative Examples 15–20 relate to a (1+5) structure.

Comparative Example 15 shows that the resistance to corrosion propagation was as poor as 85 mm when the core forming ratio Rc was less than 0.12.

Comparative Example 16 shows that the cord strength was deteriorated when the core helical pitch Pc was less than 3.0 dc/0.34.

Comparative Example 17 shows that the cord strength was deteriorated when the core forming ratio Rc was 1.0.

Comparative Example 18 shows that the resistance to corrosion propagation was as poor as 100 mm when the core helical pitch Pc was larger than 10.0 dc/0.34.

Comparative Example 19 shows that the resistance to corrosion propagation was as poor as 55 mm when the helical direction was the same as the sheath twisting direction.

In Table 11, Comparative Example 20 shows that the cord strength was deteriorated when the core forming ratio Rc was larger than 1.0.

Comparative Examples 21–28 relate to a (1+6) structure.

Comparative Example 21 shows that the resistance to corrosion propagation was as poor as 100 mm when the core forming ratio Rc was less than 0.12.

Comparative Example 22 shows that the cord strength was deteriorated when the core helical pitch Pc was smaller than 3.0 dc/0.34. Comparative Example 23 shows that the cord strength was deteriorated when the core shaping ratio Rc was larger than 1.5.

Comparative Example 24 shows that the resistance to corrosion propagation was as poor as 100 mm when the core helical pitch Pc was larger than 10.0 dc/0.34.

In Table 12, Comparative Examples 25 and 26 relate to cases where no core forming was effected, and show that the resistance to corrosion resistance was deteriorated in both cases and when the sheath filament diameter was thinner. The cord strength was also lowered.

Comparative Example 27 shows that the resistance to corrosion propagation was poor when the core forming helical direction was the same as the sheath twisting direction.

Comparative Example 28 shows that the cord strength was deteriorated when the core forming ratio was larger than 1.5 (the filament diameter was as small as 0.23 mm in both core and sheath).

Comparative Example 29 shows that the resistance to corrosion propagation was poor for a (1+7) structure when the core forming ratio Rc was smaller than 0.42.

Comparative Example 30 shows that the resistance to corrosion propagation was poor for a (1+8) structure when the core forming ratio Rc was smaller than 0.74.

COMPARATIVE EXAMPLES 31–42

Following the procedures of Examples 1–16 under the conditions as shown in Tables 13–14, tires were prepared and the properties were tested. The results are shown in Tables 13 and 14. In Comparative Examples 31, 32, 37 and 38, θ was outside of the numerical range of the present invention. In Comparative Examples 33, 34, 39 and 40, I was outside of the numerical range of the present invention. In Comparative Examples 35, 36, 41, and 42, G was outside of the numerical range of the present invention.

In the above cases, separation occurred as a result of the tire running. When the tires of Examples 1–5 were made under the conditions of θ=16°, I=0.8 mm, G=0.6 mm and those of Examples 7–16 under θ=16°, I=0.85 mm and G=0.6 mm, no separation occurred.

COMPARATIVE EXAMPLES 43–48

Following the procedures of Examples 17–32 under the conditions in Table 15, tires were prepared and tested. The results are shown in Table 15.

θ in Comparative Examples 43 and 44, I in Comparative Examples 45 and 46, and G in Comparative Examples 47 and 48 were outside of the respective numerical conditions of the present invention, and separation occurred as a result of the tire running.

When the tires of Examples 17–32 were made under θ=16°, I=0.85 mm and G=0.6 mm, no separation occurred.

TABLE 13

| Comparative Example | 31 | 32 | 33 | 34 | 35 | 36 |
|---|---|---|---|---|---|---|
| Core forming ratio Rc | 0.62 | 0.62 | 0.62 | 0.62 | 0.62 | 0.62 |
| Core waveform pitch Pc (mm) | 5.5 | 5.5 | 5.5 | 5.5 | 5.5 | 5.5 |
| Cord structure | 1 + 5 | 1 + 5 | 1 + 5 | 1 + 5 | 1 + 5 | 1 + 5 |
| Core filament diameter dc (mm) | 0.34 | 0.34 | 0.34 | 0.34 | 0.34 | 0.34 |
| Sheath filament diameter ds (mm) | 0.34 | 0.34 | 0.34 | 0.34 | 0.34 | 0.34 |
| Sheath twisting pitch Ps (mm) | 17 | 17 | 17 | 17 | 17 | 17 |
| θ (degree) | 11 | 31 | 16 | 16 | 16 | 16 |
| I (mm) | 0.8 | 0.8 | 0.4 | 2.2 | 0.8 | 0.8 |
| G (mm) | 0.6 | 0.6 | 0.6 | 0.6 | 0.03 | 2.5 |
| Resistance to corrosion propagation (mm) | 10 | 10 | 10 | 10 | 10 | 10 |
| Cord strength (kgf) | 170 | 170 | 170 | 170 | 170 | 170 |
| Occurrence of separation | Yes | Yes | Yes | Yes | Yes | Yes |

TABLE 14

| Comparative Example | 37 | 38 | 39 | 40 | 41 | 42 |
|---|---|---|---|---|---|---|
| Core forming ratio Rc | 0.62 | 0.62 | 0.62 | 0.62 | 0.62 | 0.62 |
| Core waveform pitch Pc (mm) | 5.5 | 5.5 | 5.5 | 5.5 | 5.5 | 5.5 |
| Cord structure | 1 + 6 | 1 + 6 | 1 + 6 | 1 + 6 | 1 + 6 | 1 + 6 |
| Core filament diameter dc (mm) | 0.34 | 0.34 | 0.34 | 0.34 | 0.34 | 0.34 |
| Sheath filament diameter ds (mm) | 0.34 | 0.34 | 0.34 | 0.34 | 0.34 | 0.34 |
| Sheath twisting pitch Ps (mm) | 17 | 17 | 17 | 17 | 17 | 17 |
| Resistance to corrosion propagation (mm) | 10 | 10 | 10 | 10 | 10 | 10 |
| Cord strength (kgf) | 199 | 199 | 199 | 199 | 199 | 199 |
| θ (degree) | 11 | 31 | 16 | 16 | 16 | 16 |
| I (mm) | 0.85 | 0.85 | 0.4 | 2.2 | 0.85 | 0.85 |
| G (mm) | 0.6 | 0.6 | 0.6 | 0.6 | 0.30 | 2.5 |
| Occurrence of separation | Yes | Yes | Yes | Yes | Yes | Yes |

TABLE 15

| Comparative Example | 43 | 44 | 45 | 46 | 47 | 48 |
|---|---|---|---|---|---|---|
| Core forming ratio Rc | 0.62 | 0.62 | 0.62 | 0.62 | 0.62 | 0.62 |
| Core helical pitch Pc (mm) | 5.5 | 5.5 | 5.5 | 5.5 | 5.5 | 5.5 |
| Cord structure | 1 + 6 | 1 + 6 | 1 + 6 | 1 + 6 | 1 + 6 | 1 + 6 |
| Core filament diameter | 0.34 | 0.34 | 0.34 | 0.34 | 0.34 | 0.34 |
| dc (mm) | | | | | | |
| Sheath filament diameter ds | 0.34 | 0.34 | 0.34 | 0.34 | 0.34 | 0.34 |
| Sheath twisting pitch Ps (mm) | 17 | 17 | 17 | 17 | 17 | 17 |
| Core forming helical direction | Z | Z | Z | Z | Z | Z |
| Sheath twisting direction | S | S | S | S | S | S |
| Resistance to corrosion propagation (mm) | 10 | 10 | 10 | 10 | 10 | 10 |
| Cord strength (kgf) | 199 | 199 | 199 | 199 | 199 | 199 |
| θ (degree) | 11 | 31 | 16 | 16 | 16 | 16 |
| I (mm) | 0.85 | 0.85 | 0.4 | 2.2 | 0.85 | 0.85 |
| G (mm) | 0.6 | 0.6 | 0.6 | 0.6 | 0.30 | 2.1 |
| Occurrence of separation | Yes | Yes | Yes | Yes | Yes | Yes |

What is claimed is:

1. A pneumatic tire comprising a cross belt reinforced with steel cords, the steel cords each comprising:

a single wavy core steel filament having a sinusoidal shape, and five to eight twisting sheath steel filaments disposed around the wavy core steel filament, the pitch Pc of the wavy core steel filament being in the following range, $$3.0 \ dc/0.34 \leq Pc \leq 10.0 \ dc/0.34$$

where dc is the diameter of the core steel filament, and the core forming ratio Rc=Lc/dc where dc is as defined above and Lc is an amplitude of the wave of the core steel filament being selected from the group consisting of $0.12 \leq Rc \leq 1.0$ in the case of five sheath steel filaments, $0.12 \leq Rc \leq 1.5$ in the case of six sheath steel filaments, $0.48 \leq Rc \leq 1.86$ in the case of seven sheath steel filaments, $0.98 \leq Rc \leq 2.36$ in the case of eight sheath steel filaments, and wherein (i) an angle θ formed by the steel cords and the equatorial plane of the tire is:

$12° \leq θ \leq 30°$;

(ii) a gap I between any two adjacent steel cords in one layer of the cross belt is:

$0.5 \ mm \leq I \leq 2.0 \ mm$; and (iii) a gauge G of the gum between any two facing steel cords in different layers of the cross belt is:

$0.35 \ mm \leq G \leq 2.0 \ mm$.

2. The pneumatic tire according to claim 1 in which the diameter of the core steel filament dc is substantially the same as the diameter of the sheath steel filaments ds.

3. The pneumatic tire according to claim 1 in which a spiral filament is added to the steel cord.

4. The pneumatic tire according to claim 1 in which the carbon content of the steel in the steel cords is 0.80–0.85% by weight.

* * * * *